(12) United States Patent
Marechal et al.

(10) Patent No.: US 6,852,406 B2
(45) Date of Patent: Feb. 8, 2005

(54) ANTI-STATIC, ANTI-REFLECTION COATING

(75) Inventors: Nadine Genevieve Marechal, Glenelg North (AU); Richard Simon Blacker, Sonoma, CA (US)

(73) Assignee: Sola International Holdings, Ltd., Lonsdale (AU)

( * ) Notice: Subject to any disclaimer, the term of this patent is extended or adjusted under 35 U.S.C. 154(b) by 0 days.

(21) Appl. No.: 10/182,323

(22) PCT Filed: Jan. 3, 2001

(86) PCT No.: PCT/AU00/00004

§ 371 (c)(1),
(2), (4) Date: Nov. 7, 2002

(87) PCT Pub. No.: WO01/55752

PCT Pub. Date: Aug. 2, 2001

(65) Prior Publication Data

US 2003/0179343 A1 Sep. 25, 2003

Related U.S. Application Data

(63) Continuation of application No. 09/491,407, filed on Jan. 26, 2000, now abandoned.

(51) Int. Cl.[7] .................................................. B32B 9/00
(52) U.S. Cl. .................... 428/336; 428/220; 428/216; 428/339; 428/426; 428/432; 428/689; 428/699; 428/702; 428/696; 427/166; 427/250; 427/255.23; 427/255.26; 427/255.28; 427/255.29; 427/255.31; 427/255.32; 427/255.33; 427/255.34; 427/255.36; 427/255.38; 427/255.395; 351/44; 351/159; 351/177; 359/601; 359/642

(58) Field of Search .................. 351/41, 44, 159, 351/177; 359/601, 642; 427/162, 164, 165, 166, 248.1, 250, 255.23, 255.26, 255.28, 255.29, 255.31, 255.32, 255.33, 255.34, 255.36, 255.38, 255.395; 428/220, 216, 212, 332, 336, 339, 426, 432, 688, 689, 699, 702, 696

(56) References Cited

U.S. PATENT DOCUMENTS 2,394,533 A 2/1946 Colbert et al.
2,758,510 A 8/1956 Auwärter (List continued on next page.)

FOREIGN PATENT DOCUMENTS

EP 0 456 488 11/1991
EP 0753762 1/1997

(List continued on next page.)

OTHER PUBLICATIONS

U.S. Appl. No. 09/403,608, Yip et al.
U.S. Appl. No. 09/414,991, Lin et al.

(List continued on next page.)

*Primary Examiner*—Deborah Jones
*Assistant Examiner*—Wendy Boss
(74) *Attorney, Agent, or Firm*—Burns, Doane, Swecker & Mathis, L.L.P.

(57) ABSTRACT

An anti-static, anti-reflection, transparent coating for a transpatent substrate, the coating including at least one electrically conductive layer, wherein the sheet resistance of the coating is less than about $10^{10}$ ohm/square. The coating is preferably higher transparent.

55 Claims, 7 Drawing Sheets

U.S. PATENT DOCUMENTS

| | | | |
|---|---|---|---|
| 3,410,625 A | 11/1968 | Edwards |
| 3,679,291 A | 7/1972 | Apfel et al. |
| 3,708,225 A | 1/1973 | Misch et al. |
| 3,901,997 A | 8/1975 | Groth |
| 3,978,272 A | 8/1976 | Donley |
| 4,022,947 A | 5/1977 | Grubb et al. |
| 4,172,156 A | 10/1979 | Ritter et al. |
| 4,632,527 A | 12/1986 | Masso et al. |
| 4,649,088 A | 3/1987 | Mitsui et al. |
| 4,954,591 A | 9/1990 | Belmares |
| 5,054,902 A | 10/1991 | King |
| 5,085,888 A * | 2/1992 | Morimoto et al. | 427/108 |
| 5,104,692 A | 4/1992 | Belmares |
| 5,173,368 A | 12/1992 | Belmares |
| 5,450,288 A | 9/1995 | Tanuma et al. |
| 5,667,880 A | 9/1997 | Okaniwa |
| 5,704,692 A | 1/1998 | Purdy et al. |
| 5,719,705 A | 2/1998 | Machol |
| 5,728,456 A | 3/1998 | Adair et al. |
| 5,744,227 A | 4/1998 | Bright et al. |
| 5,783,049 A | 7/1998 | Bright et al. |
| 5,846,650 A | 12/1998 | Ko et al. |
| 5,883,169 A | 3/1999 | Spector et al. |
| 5,949,518 A | 9/1999 | Belmares et al. |
| 6,077,569 A | 6/2000 | Knapp et al. |
| 6,109,748 A | 8/2000 | Spector et al. |
| 6,175,450 B1 | 1/2001 | Andreani et al. |
| 6,258,218 B1 | 7/2001 | Burton |
| 6,334,681 B1 | 1/2002 | Perrott et al. |
| 6,372,354 B1 * | 4/2002 | Park et al. | 428/447 |
| 6,420,451 B1 | 7/2002 | Lin et al. |
| 6,551,710 B1 | 4/2003 | Chen et al. |

FOREIGN PATENT DOCUMENTS

| | | |
|---|---|---|
| EP | 0 913 712 | 5/1999 |
| GB | 1074655 | 7/1967 |
| GB | 1 261 242 | 1/1972 |
| GB | 2 268 509 | 12/1994 |
| WO | WO 96/41215 | 12/1996 |
| WO | WO 98/32152 | 7/1998 |

OTHER PUBLICATIONS

U.S. Appl. No. 09/491,407, Marechal et al.
U.S. Appl. No. 09/586,620, Ruegg.
U.S. Appl. No. 09/726,970, Lin et al.
U.S. Appl. No. 09/742,808, Lin et al.
U.S. Appl. No. 09/856,328, Yip et al.
U.S. Appl. No. 09/856,337, Yip et al.
U.S. Appl. No. 10/089,470, Diggins et al.
U.S. Appl. No. 10/122,353, Macchi et al.
U.S. Appl. No. 10/239,071, Chen et al.
U.S. Appl. No. 10/381,699, Chen.
U.S. Appl. No. 10/485,665, Marechal.
Dr. A. Ross, "Structure and properties of Thin Layers With Reference to Their Use in Ocular Optics," article, 1957.

* cited by examiner

ANTI-STATIC, ANTI-REFLECTION COATING

This is a continuation of Ser. No. 09/491,407, filed Jan. 26, 2000, now abandoned.

FIELD OF THE INVENTION

The present invention relates to anti-reflection coatings for transparent substrates, such as ophthalmic lenses, the coating being such as to provide anti-static properties.

BACKGROUND OF THE INVENTION

Ophthalmic lenses have traditionally been formed as a single integral body of glass or plastic. However, lenses are now also fabricated by laminating two lens wafers together with transparent adhesive. Regardless of how they are constructed, ophthalmic lenses often include an anti-reflection coating to improve transmittance of visible light.

Attempts have been made to provide anti-static, anti-reflection coatings (for a variety of products), and these attempts have largely centred on the theory of producing an electrically conductive (and thus substantially static resistant) anti-reflection coating. However, in practice it has proven to be virtually impossible to produce an anti-reflection coating for an ophthalmic lens product where the coating is highly transparent and truly is substantially static resistant. Indeed, to the best of the applicant's knowledge, there are no anti-reflection coated lens products on the market that actually exhibit acceptable, repeatable and durable antistatic properties.

In this respect, it should be noted that the applicant considers a product to exhibit acceptable anti-static properties when, after the product's surface has been rubbed with a suitable fabric (such as a piece of foam, a lint-free cotton cheesecloth, or a 100% polyester lens cleaning cloth), it exhibits virtually no 'small particle attraction'; namely, substantially no small particles (such as talc powder, dust, tissue pieces, etc) are attracted onto the surface. Such an acceptable anti-static result may be generally correlated with a static voltage value of 0 kV±0.1 kV when the surface is rubbed for one minute with, for instance, a piece of foam. Therefore, a value other than 0 kV±0.1 kV will generally indicate that a product is 'static' and shows 'small particle attraction'.

It is an aim of the present invention to provide an anti-static, anti-reflection coating that is suitable for use with ophthalmic lenses, which coating exhibits acceptable anti-static properties together with high transparency.

SUMMARY OF THE INVENTION

The present invention provides an anti-static, anti-reflection, transparent coating for a transparent substrate, the coating including at least one electrically conductive layer, wherein the sheet resistance of the coating is less than about $10^{10}$ ohm/square. The coating is preferably highly transparent.

Before turning to a general discussion of the coating of the present invention, the terms 'anti-reflection', 'highly transparent' and 'sheet resistance' require clear definition.

With reference to a coating, the term 'anti-reflection' refers to a transparent, usually multi-layer, film that is applied to the surface of a transparent substrate to substantially eliminate reflection over a relatively wide portion of the visible spectrum, thereby increasing the transmission of light and reducing surface reflectance. In particular, a suitable numerical representation of a coating that is considered to be anti-reflective is where the luminous reflection of the substrate is lower than about 4%, when the substrate has been coated on both sides with the anti-reflection coating.

The term 'highly transparent' as used throughout this specification is again most readily understood with reference to a substrate that has been coated on both sides with a coating. In these circumstances, and within the context of the present invention, the term 'highly transparent' is to be understood to mean a luminous (photopic) transparency higher than about 95% and a luminous absorption lower than about 1%.

However, it will be appreciated from the following description of various aspects of the present invention that the substrate to which the coating of the present invention may be applied may be a tinted substrate such as a tinted ophthalmic lens intended for use as a sunglass lens. In this form of the invention, it should be appreciated that the luminous transparency of the coated substrate will most likely not be as high as 95%, but actually may be anywhere between 5% and 95%. Irrespective of this, a coating applied to such a substrate in accordance with the present invention will still be considered to be highly transparent.

Finally, 'sheet resistance' as used throughout this specification is to be understood to be a measure of the resistivity of a coating measured at the surface of the coating. The sheet resistance of a coating on a flat substrate may be readily measured by using a commercially available device such as a concentric ring probe. It is also possible to measure the sheet resistance of a coating on a curved substrate (such as an ophthalmic lens) by using a probe with a geometry adapted to the curvature of the curved substrate, there thus being satisfactory contact between the probe and the surface of the substrate. Of course, a skilled addressee will appreciate that there will usually be no appreciable difference between the sheet resistance of a coating on a flat substrate and the sheet resistance of the same coating on a curved substrate.

The transparent substrate to be coated with the coating of the present invention may be any material having superior structural and optical properties. Glass, crystalline quartz, fused silica, soda-lime silicate glass, and plastics such as polymers based on allyl diglycol carbonate monomers (such as CR-39™ available from PPG Industries, Inc. and SPECTRALITE™ and FINALITE™ available from the applicant) and polycarbonates (such as LEXAN™ available from General Electric Co.) are preferred substrate materials.

The transparent substrate is preferably an ophthalmic lens, and may be an ophthalmic lens of any type intended for any purpose. This includes lenses with or without optical corrections and whether for use indoors or outdoors (such as with sunglass lenses, subject to the above comments).

The ophthalmic lens may be a single integral body ophthalmic lens or a laminated ophthalmic lens fabricated by bonding two lens wafers (namely a front wafer and a back wafer) together in a suitable manner, such as by use of a transparent adhesive.

The coating of the present invention may include any number of layers, and may thus be a multi-layer coating. Preferably, the coating includes from 2 to 12 layers, although more preferably from 3 to 7 layers. Preferably, the coating has a thickness in the range from about 100 to 750 nm, although for use with ophthalmic lenses the coating preferably has a thickness in the range of from about 220 to 500 nm.

Furthermore, the electrically conductive layer is preferably incorporated in a multilayer coating so as to be under at least one layer of a low refractive index material such as silicon dioxide to assist in achieving low surface reflectance. In this respect, a person skilled in the art will appreciate that the conductive layer may be located anywhere in the multiple-layers of a coating provided of course that its thickness and position are still capable of providing the substrate with the desired anti-reflection properties.

In one form, a three layer coating is provided. With reference to the substrate being lowermost and the surface of the coating being uppermost, in this form the coating may include a lower layer of a mid-refractive index material such as silicon oxynitride, a high refractive index intermediate layer of the indium-tin oxide (the preferred electrically conductive layer of the invention), and a low refractive index outer layer of a material such as silicon dioxide.

In this respect, by 'high refractive index' is meant an index of refraction (at a referenced wavelength of about 550 nm) that is greater than about 1.9. By 'low refractive index' is meant an index of refraction (again at a referenced wavelength of about 550 nm) that is less than about 1.5. By 'mid refractive index' is meant an index of refraction (again at a referenced wavelength of about 550 nm) between about 1.5 and 1.9.

In this form of the invention (the three layer form), the main function of the low refractive index outer layer is to assist in the provision of anti-reflection properties to the coating. However, it is believed that this outer layer may function as an encapsulation layer to preserve the conductive intermediate layer from further oxidation by exposure to ambient air. Without wishing to be bound by theory, it is possible that a conductive layer of indium-tin oxide is deposited having a density of oxygen vacancies that confers the conduction properties. If these vacancies are filled with oxygen coming from exposure to air, the indium-tin oxide layer possibly becomes fully stoichiometric and therefore less conductively effective.

If the coating is to comprise four or more layers, it will be preferred to alternate layers of high and low refractive index (with the low refractive index being the uppermost layer). The materials may thus be chosen from a large range of suitable materials (generally oxides or transparent nitrides) provided the materials have high transparency and the desired refractive index values.

In one such embodiment, the coating may be a seven layer coating comprising an adhesion layer of chrome oxide on the substrate and subsequent alternating layers of low and high refractive index material, the electrically conductive layer being between the adhesion layer and the outer layer. Preferably, the electrically conductive layer is indium tin oxide, the low refractive index material is silicon dioxide, and the high refractive index material is titanium dioxide or zirconium oxide.

The electrically conductive layer in the coating of the present invention is preferably of a material that is electrically conductive and also highly transparent. In this respect, some materials that are known to provide good electrical conductivity properties are not considered to be highly transparent. Thus, the electrically conductive layer is preferably of a material selected from the group comprising oxides of indium, tin and zinc. Indium-tin oxide and tin oxide are the preferred materials.

The electrically conductive layer may contain a dopant to increase conductivity, without altering the optical transparency. Suitable examples of dopant include fluorine, antimony, aluminium, boron, phosphor or indium.

As mentioned above, the coating of the present invention must comprise at least one layer that is electrically conductive. In this respect, it is believed that the presence of at least one electrically conductive layer effectively prevents appreciable electrostatic charge build-up by continuously discharging the charge. Indeed, the present inventors have found that by adapting at least one electrically conductive layer such that the sheet resistance of the coating is less than about $10^{10}$ ohm/square, the coating is indeed provided with acceptable anti-static properties.

The inventors have identified various techniques for ensuring that the sheet resistance of the inventive coating is less than about $10^{10}$ ohm/square. The present invention thus also relates to a method of coating a transparent substrate with an anti-static, anti-reflection, transparent coating having a sheet resistance less than about $10^{10}$ ohm/square. The coating may be achieved by conventional film vapour deposition techniques (chemical and physical) including reactive sputtering, electron beam evaporation, with or without ion assistance, and chemical vapour deposition.

In one form of the present invention, the at least one electrically conductive layer may be deposited using evaporation techniques. Such evaporation techniques generally involve the evaporation of material from a source as a result of thermal heating, either by a hot filament or by an electron beam. This may occur either as sublimation or as melting. In such techniques, thermally evaporated material may undergo controlled reactions such as oxidation in order to provide the condensate with the required optical and physical properties.

For example, this may require the evaporation of $Ti_2O_3$ in order to provide a substrate with a coating of $TiO_2$. Alternatively, this may require the evaporation of $SiO_2$ to provide a substrate with a condensed coating of $SiO_2$. In this respect, it will be appreciated that in the former example, it will be necessary to add additional oxygen to the evaporative flux in order to raise the oxygen level to the correct stoichiometry.

Preferably, the process of evaporation is assisted by providing the substrate surface with extra energy from a source such as an ion beam. With ion-assisted deposition, low-energy ion bombardment of the substrate surface during deposition of evaporated atoms provides surface cleaning, improved nucleation and growth, and in situ annealing which produces evaporated coatings of improved quality.

While the preferred source is an ion beam, it should be appreciated that the source may alternatively be any other suitable ion or neutral atom beam source such as a saddle field source, or an advanced plasma system such as that manufactured by Leybold GmbH.

In the preferred evaporative technique, the coating method comprises the evaporation of a source material in a gas phase, such as the evaporation of an indium oxide/tin oxide material in an argon-oxygen gas mixture. It will however be appreciated that other suitable source materials, gaseous atmospheres and ion assistance may be utilised as necessary. For example, another suitable source material is envisaged to be a doped zinc oxide where the dopant may be aluminium, boron, phosphor or indium.

Yet another method for coating a substrate with a coating in accordance with the present invention involves the use of sputtering techniques. Sputtering techniques involve the physical ejection of material from a target as a result of ion bombardment. The ions are usually created by collisions between gas atoms and electrons in a glow discharge. The ions are accelerated into the target cathode by an electric field, and a substrate is placed in a suitable location so that it intercepts a portion of the ejected atoms. Thus, a coating is deposited on the surface of the substrate.

In reactive sputtering, a reactant gas forms a compound with the material that is sputtered from the target. When the target is silicon and the reactive gas is oxygen, for instance, silicon oxides, usually in the form of $SiO_2$, are formed on the surface of the substrate. Another sputtering technique is to first form a sputtered metal layer on a substrate and thereafter expose this layer to a reactive gas (such as oxygen) to form a metal oxide.

In the preferred form, the method comprises the reactive sputtering of a target in a gas phase, such as the sputtering of an indium-tin target in an argon-oxygen gas mixture. Whilst metallic targets (most usually of corresponding oxides) were used in the development of this invention, it will be appreciated that targets of electrically conductive oxides can also be sputtered.

Where the method comprises the reactive sputtering of a metallic target, it has been found by the inventors that the sheet resistance of the ultimate coating can be maintained below $10^{10}$ ohm/square by controlling the gas phase composition within certain limits. Alternatively, transparent layers of low resistivity materials can be prepared from targets comprised either in full or partly of the transparent conductive material itself.

With the preferred use of a metallic target, controlling the gas phase composition within certain limits will generally require controlling the respective concentrations of argon and oxygen in the gas mixture. Preferably, the oxygen concentrations are maintained at comparatively high levels in order to assist in obtaining a coating of high transparency. In the preferred oxygen/argon system, an indium-tin target would be sputtered in pure oxygen or with a ratio of partial pressures of $PPAr/PPO_2$ up to about 15%, although preferably at about 9%.

However, it will be appreciated that deposition parameters are numerous for different sputtering techniques, and meaningful figures can often only be supplied for one given deposition system. Thus, for any given system, a skilled addressee will appreciate that it will be necessary to investigate the variation of the sheet resistance of a coating as a function of the deposition conditions (particularly the gas phase composition). The system parameters that are likely to alter from one system to the next are parameters such as the geometry of the chamber, the target size, the power applied to the target, the target voltage, the distance between the substrate and the target, the target composition, gas flow-rates, pumping speed, total pressures, and the like.

For instance, the examples below illustrate a reactive sputtering embodiment that utilised a specific set of system parameters. In particular, a metallic target was used of 90% indium and 10% tin, sputtered in poisoned mode such that the surface was partially oxidised. The system used a distance from substrate to target of 115 mm and a rotation speed of the drum holding the substrate (lenses) of 90 rpm. The power applied to the target was set at 4.5 kW that corresponded to a target voltage of about 393V. Using these parameters, the sputtering of an indium-tin target in an argon/oxygen atmosphere with partial pressures $PPAr/PPO_2$ up to about 15% (preferably about 9%), resulted in the production of an electrically conductive layer to provide a coating with a sheet resistance less than about $10^{10}$ ohm/square.

In this respect, it should be noted that in this embodiment of the invention it is generally preferred to maintain the target voltage generally constant during deposition.

It will thus be appreciated that for a different set of deposition system parameters, the gas phase composition may need to be controlled to be within different limits in order to ensure that the sheet resistance of the coating is less than $10^{10}$ ohm/square.

Indeed, it will thus also be appreciated that the present invention also provides a method of fabricating a transparent article, the method including the steps of:

providing a transparent substrate; and forming on a surface of the transparent substrate an anti-static, anti-reflection transparent coating having at least one electrically conductive layer, such that the sheet resistance of the coating is less than about $10^{10}$ ohm/square.

Preferably, the transparent substrate is an ophthalmic lens, and the coating is highly transparent.

Finally, it has been determined that a coating in accordance with the present invention advantageously also shields the substrate from electromagnetic waves.

DESCRIPTION OF THE PREFERRED EMBODIMENTS

The present invention will now be described with reference to various examples that illustrate different preferred embodiments. Where appropriate, aspects of the examples are described with reference to various graphs depicted in the accompanying Figures. It is to be understood that the following description of the examples is not to limit the generality of the above description.

Figure 7A:
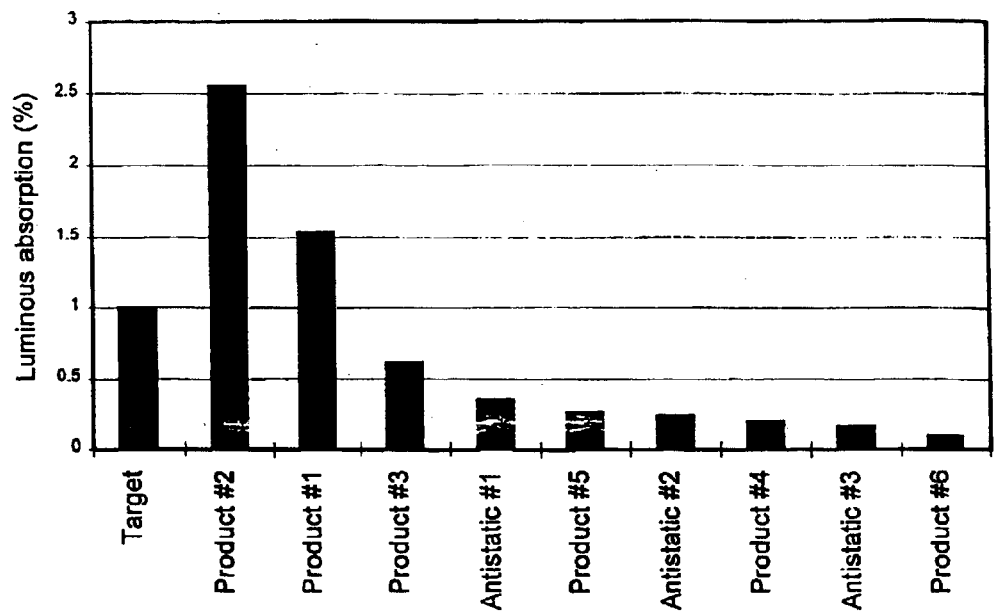
Figure 8A:
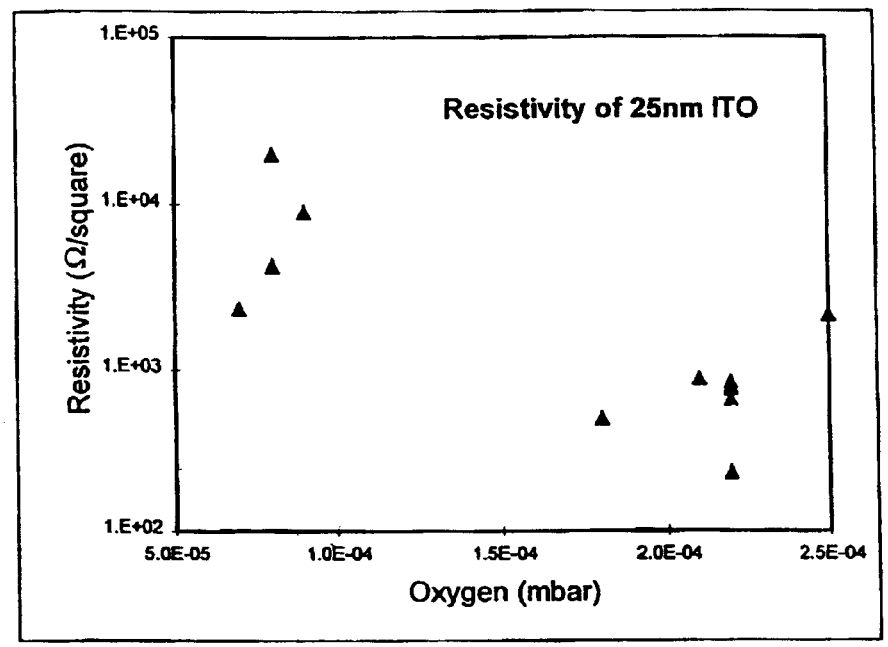
Figure 9:
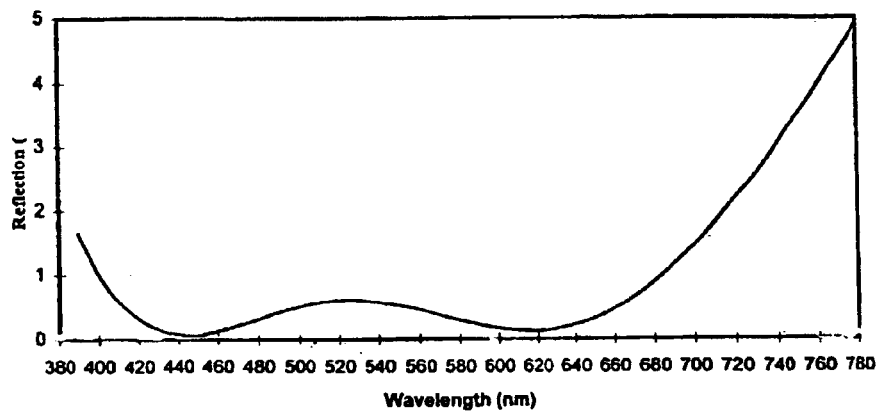
Figure 10:
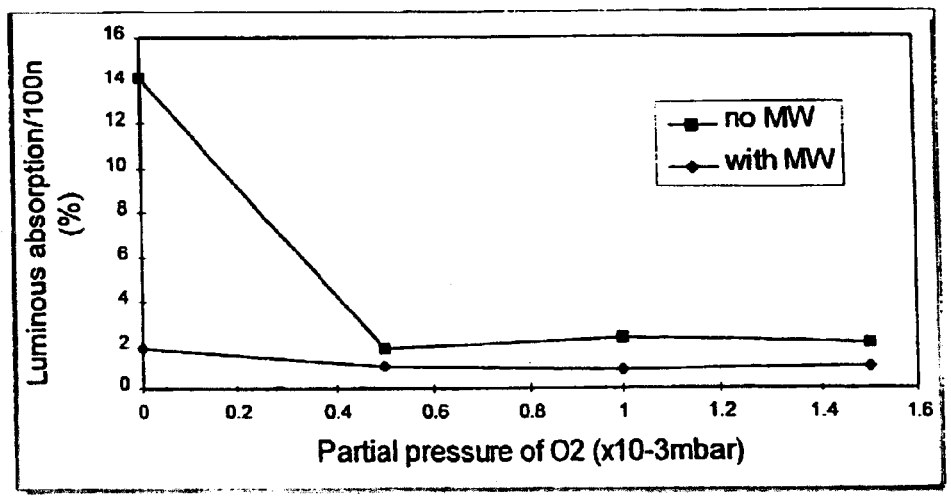
Figure 11:
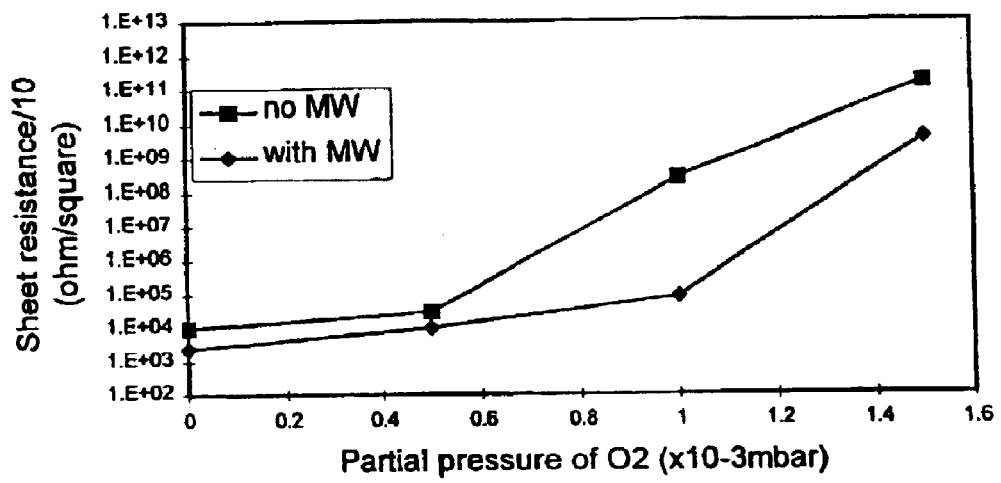
Figure 12:
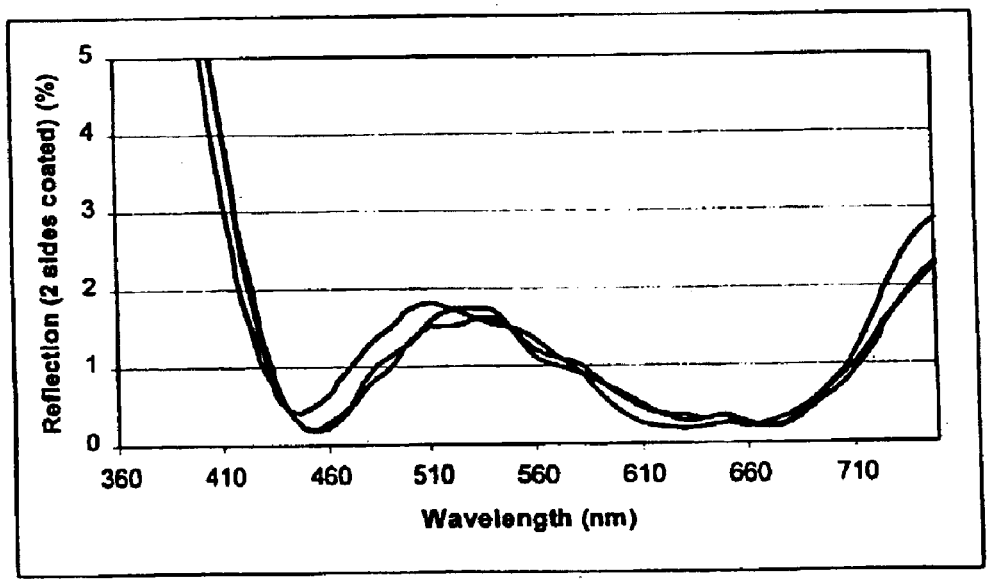

FIGS. 7(a) and (b) show the luminous absorption and the absorption at 440 nm respectively of various known products in comparison with antistatic samples in accordance with the first preferred embodiment;

FIGS. 8(a) and (b) show the effect of oxygen concentration on resistivity and optical loss for samples in accordance with a second preferred embodiment;

FIG. 9 shows the reflection spectra of a sample in accordance with the second preferred embodiment;

FIG. 10 shows the luminous absorption of ITO films versus partial pressure of oxygen for coatings in accordance with the third preferred embodiment;

FIG. 11 shows the sheet resistance of 20 to 30 nm thick ITO films versus partial pressure of oxygen in accordance with the third preferred embodiment; and FIG. 12 shows the spectral reflection of three hardcoated plano lenses coated on both sides with a coating in accordance with the third preferred embodiment.

FIRST PREFERRED EMBODIMENT

In accordance with a first preferred embodiment of the present invention, an anti-reflection coating (in the form of a thin film) comprising an electrically conductive layer of indium-tin oxide (ITO) was deposited on a number of transparent substrates by reactive sputtering in order to test for deposition rate, absorption, optical properties, static properties and resistivity properties.

The transparent substrates were polycarbonate and glass sheets for the determination of deposition rate and absorption, CR-39 flat substrates for resistivity measurements, and hard coated CR-39 plano lenses for both optical and static properties.

In relation to the various parameters measured, film thicknesses and refractive indices were estimated by fitting calculated spectra to the average of three reflection measurements obtained on a spectrophotometer; film absorption was calculated from reflection and transmission spectra; luminous (photopic) absorption was chosen as a representative value of the absorption as seen by an observer; sheet resistance was measured using a concentric ring probe; and electrostatic charge was estimated using an electrostatic field meter.

The film was deposited on the substrates by a process of reactive sputtering of an indium-tin target in an argon-oxygen gas mixture.

Figure 1:
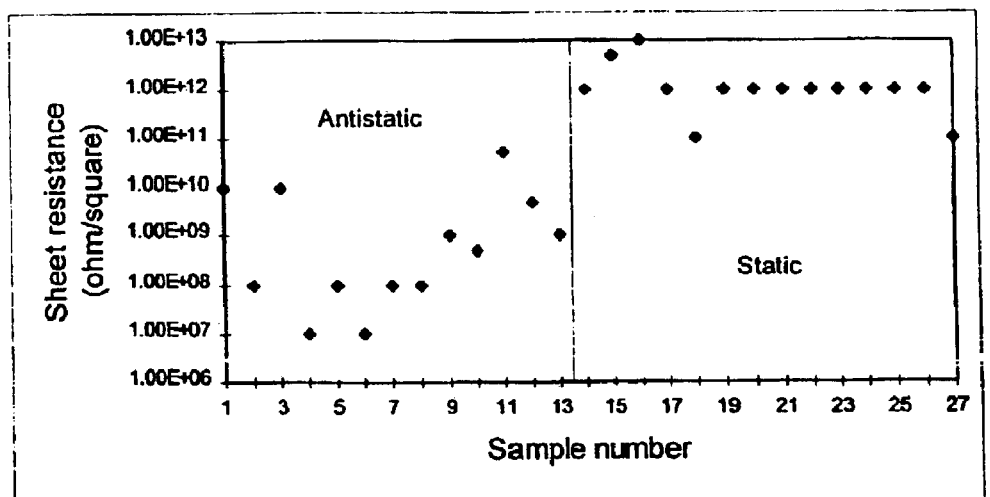
FIG. 1 is a graphical presentation of the static properties of samples in accordance with a first preferred embodiment of the present invention, together with other products, plotted against sheet resistance.

This first preferred embodiment indicated that acceptable antistatic properties are obtained when the film has a sheet resistance lower than about $10^{10}$ ohm/square, as is evidenced by FIG. 1 which graphically illustrates the static properties (in terms of a sample being either anti-static or static) in a plot of sheet resistance vs sample number. As mentioned above, a sample was considered anti-static if it exhibited virtually no small particle attraction after a rub test, and/or the static charge after 1 minute of rubbing with a foam piece was 0 kV±0.1 kV.

One of the main properties which was important in determining the sheet resistance in this preferred embodiment (namely, the embodiment using reactive sputtering as the coating technique) was the gas phase composition, and in particular was the concentration of argon and oxygen.

It was also particularly preferred that the voltage be maintained substantially constant during the coating process. In this respect, the variation in voltage was preferably no more than ±5 volts and more preferably no more than ±3 volts during deposition.

A theoretical design of a multiple layer coating in accordance with the first preferred embodiment of the present invention will now be described. While multi-layer, anti-reflection coatings (or 'stacks') may consist of 4 or 5 layers up to 100 to 200 nm in thickness of alternating low and high refractive index material, it was envisaged that a thinner conductive coating layer, such as an indium-tin oxide layer, would be required to ensure that absorption targets for the coating were met.

Figure 2:
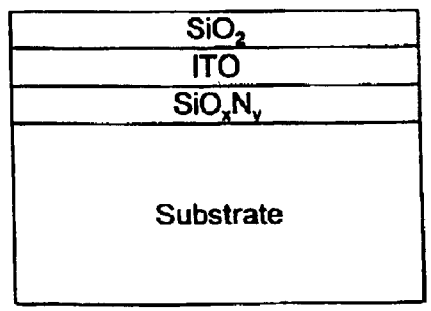
FIG. 2 is a schematic representation of a coated substrate in accordance with the first preferred embodiment.

Thus, a three layer theoretical model was generated, where the first layer (with reference to the substrate being lowermost, the 'lower' layer) was a layer of silicon oxynitride ($SiO_xN_y$), ideally deposited by sputtering material in a nitrogen-oxygen-argon gas mixture to provide a mid refractive index material immediately adjacent the transparent substrate. The second layer (the intermediate layer) was the preferred electrically conductive ITO layer, and the third (and outer) layer was the $SiO_2$ layer. FIG. 2 is a schematic representation of this model.

Theoretical designs may be created using commercially available software such as TfCalc, and by adopting optical constraints determined from the abovementioned deposition experiments. Three theoretical designs are illustrated in Table 1 below.

TABLE 1

|  | Design #1 | Design #2 | Design #3 |
|---|---|---|---|
| $SiO_xN_y$ thickness (nm) (lower layer) | 91.7 | 85.0 | 56.6 |
| ITO thickness (nm) (intermediate layer) | 37.4 | 37.2 | 107.2 |
| $SiO_2$ thickness (nm) (upper layer) | 95.6 | 97.4 | 84.6 |
| Reflection colour | green | bluish green | light green |
| Luminous reflection (%) | 0.57 | 0.46 | 0.36 |
| Optical bandwidth <1% (nm) | 290 | 275 | 317 |
| Optical band between 2 R minima | 180 | 170 | 190 |

Design #1, which had a limited ITO thickness, had a higher residual reflection value. The optical bandwidth and reflection values were comparable with typical anti-reflective coatings used in ophthalmic lenses.

A three layer stack was produced for experimental purposes in accordance with Design #1 in Table 1, using an in-house sputter deposition system designed to emulate the sputter apparatus and process commercially available from DSI Inc. (California, USA) for anti-reflection coating production.

Selected deposition conditions using the sputtering system for each of the layers are illustrated in Table 2 below. Other system conditions were:

| power applied to the indium-tin target | 4.5 kV |
| target voltage | 393 V ± 2 V |
| distance substrate-target | 115 mm |
| rotation speed of the drum holding the lenses | 90 rpm |

TABLE 2

|  | Ar flow (sccm) | Partial Pressure $O_2(N_2)$ (Pa) | Total Pressure (Pa) | Time (lens front) (s) | Time (lens back) (s) |
|---|---|---|---|---|---|
| $SiO_xN_y$ | 35 | 0.3 | 0.8 | 412 | 461 |
| ITO | 2.0 | 0.3 | 0.35 | 161 | 190 |
| $SiO_2$ | 45 | 0.11 | 0.7 | 172 | 201 |

The anti-static properties of the three layer stack were clearly established. None of the three layer stacks produced in accordance with Design #1 exhibited any static charge when charged and measured with an electrostatic field meter, nor with the simple rub test mentioned above. This was considered to comply with the requirement of exhibiting acceptable anti-static properties.

Figure 3:
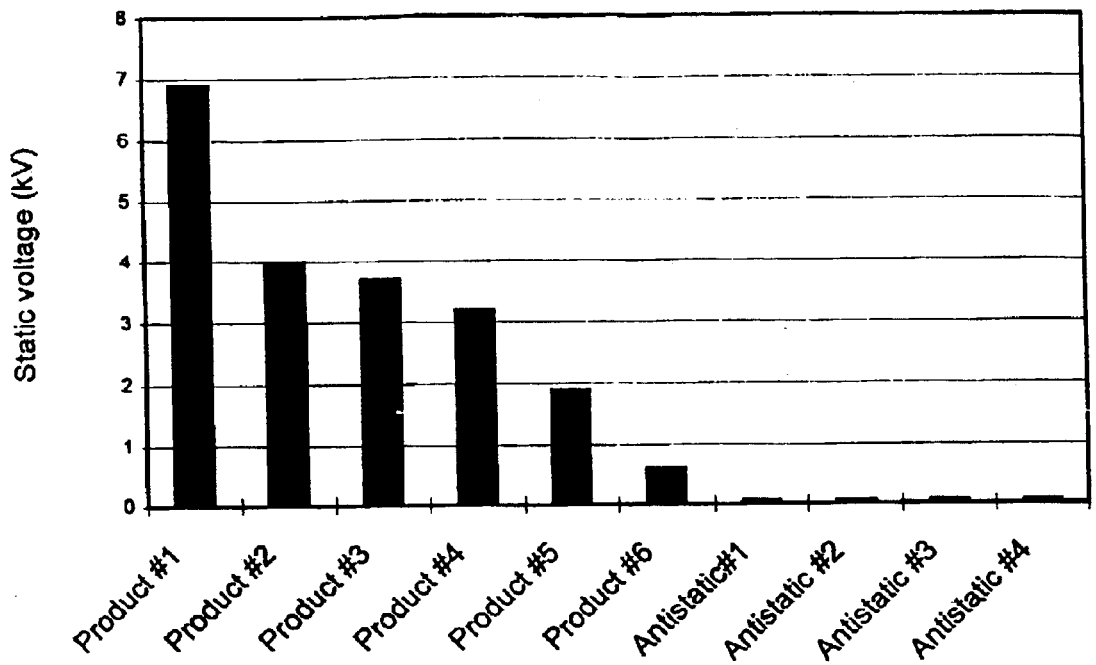
FIG. 3 is a graphical presentation of the static voltage of various known products in comparison with antistatic samples in accordance with the first preferred embodiment.

The highly anti-static behaviour of the three layer coatings of Design #1 remained intact after at least three months of weathering (and at least up to 12 months) following the deposition process. For comparison with other known anti-reflection products, reference is made to FIG. 3. The other known anti-reflection products illustrated for comparative purposes do not include a layer of electrically conductive material.

Figure 4:
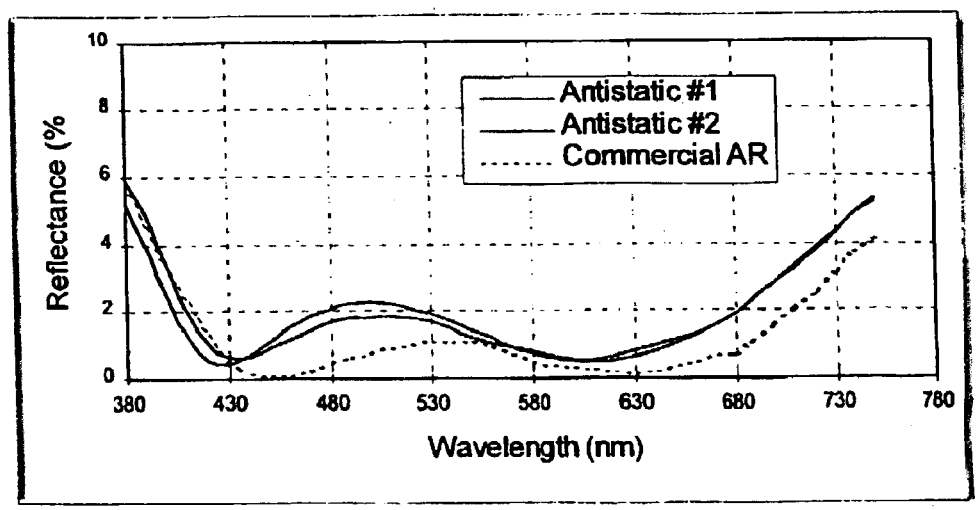
FIG. 4 is the reflection spectra of two of the samples in accordance with the first preferred embodiment compared to a known product.

The reflection spectra of the corresponding samples (both sides coated) are given in FIG. 4. With a luminous reflection close to 1% and reflection values lower than 2% between 420 and 690 nm, it can be seen that the target performance was achieved.

Figure 5:
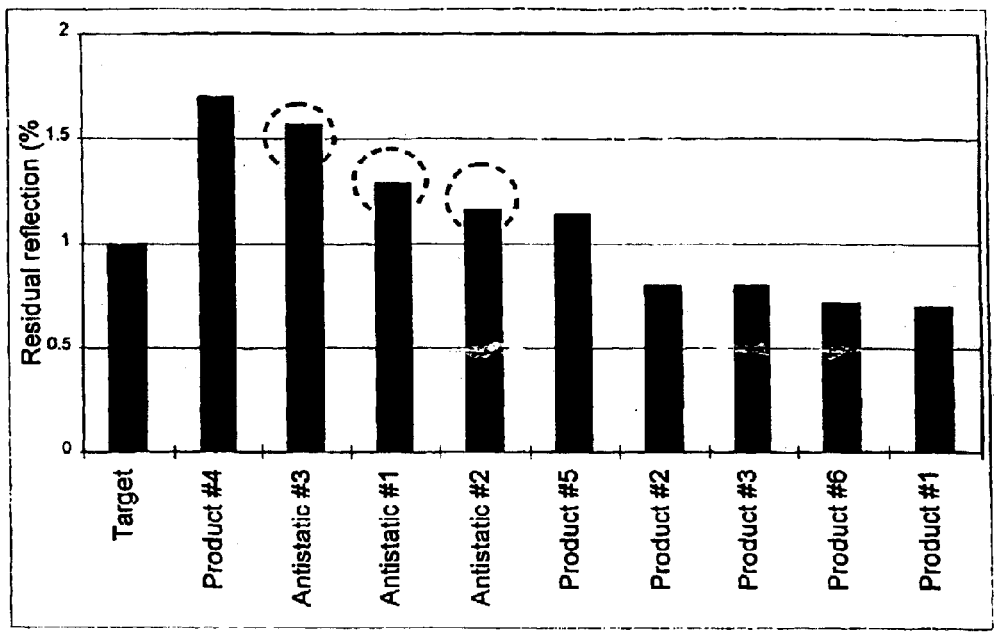
FIG. 5 shows the residual reflection of various known products in comparison with antistatic samples in accordance with the first preferred embodiment.

The residual luminous reflection of the three layer anti-reflection coating of the first embodiment of the present invention was slightly higher (1.2%–1.6%) than that of known products (0.8% in average) as is evident from FIG. 5. However, it can be seen that the luminous reflection may be reduced by using design #2 (blue-green colour) or the design using a thicker ITO layer (design #3 in Table 1).

Figure 6:
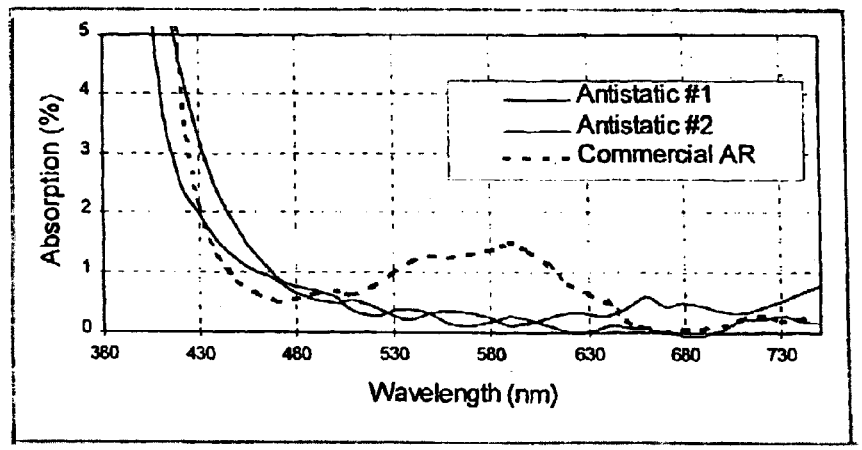
FIG. 6 is the absorption spectra of two of the samples in accordance with the first preferred embodiment compared to a known product.
Figure 7B:
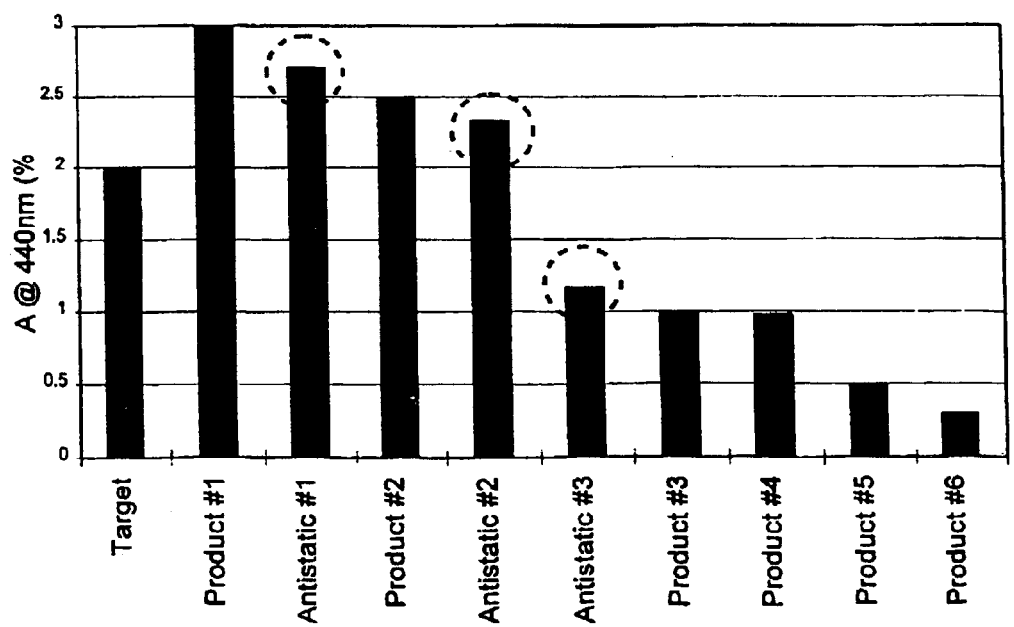

Luminous absorption for a lens coated on both sides was about 0.2%, which was well below the target requirement of about 1% (although it should be noted that there is a typical error on absorption measurements of ±0.05%). Also, it can be seen that the luminous absorption was significantly lower than most known products (see FIGS. 6 and 7a). Additionally, the absorption at 440 nm for three layer coatings in accordance with the first preferred embodiment of the present invention (namely 1.2% to 2.7%) was close to the desired target absorption (2%) and was not significantly higher than known products (see FIGS. 6 and 7b). The results on adhesion and abrasion resistance of the three layer coatings of the present invention indicated an acceptable performance for ophthalmic applications.

Second Preferred Embodiment

In accordance with a second preferred embodiment of the present invention, a further series of designs were also generated for coatings to be deposited by evaporation with indium-tin oxide layers. In this respect, it will be appreciated that deposition of the indium-tin oxide layer within a practical anti-reflection stack is possible by including the indium-tin oxide layer at various locations throughout the stack. Three further designs showing these relationships are as follows:

TABLE 3

|  | Design #4 | Design #5 | Design #6 |
|---|---|---|---|
| Layer on the Substrate | ITO (4.4 nm) | SiO$_2$ (5.0 nm) | Cr$_2$O$_3$ (1.0 nm) |
|  | SiO$_2$ (51.6 nm) | ITO (3.0 nm) | SiO$_2$ (5.6 nm) |
|  | TiO$_2$ (15.5 nm) | SiO$_2$ (36.1 nm) | ITO (3.0 nm) |
|  | SiO$_2$ (27.8 nm) | TiO$_2$ (15.0 nm) | SiO$_2$ (47.6 nm) |
|  | TiO$_2$ (114.9 nm) | SiO$_2$ (24.8 nm) | TiO$_2$ (15.5 nm) |
|  | SiO$_2$ (81.3 nm) | TiO$_2$ (114.1 nm) | SiO$_2$ (27.2 nm) |
|  |  | SiO$_2$ (81.3 nm) | TiO$_2$ (114.9 nm) |
| Layer at the Surface |  |  | SiO$_2$ (81.3 nm) |

It should be appreciated that Table 3 does not however provide an exhaustive list of designs or materials for use with the present invention. Other materials that may be used to form an anti-reflection stack in accordance with this second embodiment of the present invention may be such as Nb$_2$O$_5$, ZrO$_2$, Al$_2$O$_3$ and LiF). It should also be appreciated that the electrically conductive layer may be any other suitable transparent conductor. It should also be appreciated that the position of the electrically conductive layer can vary considerably, and may be anywhere within the stack.

In Designs #4, #5, and #6 above, the sheet resistance was found to be below $1 \times 10^{10}$ ohms/square, and the electrical discharge was sufficient to prevent any electrostatic charge build up, with the consequent small particle attraction. In addition to the required electrical properties, the coatings displayed the required physical properties discussed above in relation to the first embodiment (namely, optical properties, adhesion and abrasion resistance).

The deposition conditions for the evaporation leading to the designs in Table 3 were as follows:

| Base Pressure | $<1.5 \times 10^{-5}$ mbar |
|---|---|
| Evaporation Pressure | $<3.5 \times 10^{-3}$ mbar |
| Evaporation Rate SiO$_2$ | 0.8 nm/s |
| O$_2$ Partial Pressure for SiO$_2$ | $0.0 \times 10^{-4}$ mbar O$_2$ |
| Evaporation Rate Ti$_2$O$_3$ (for TiO$_2$ layer) | 0.3 nm/s |
| O$_2$ Partial Pressure for TiO$_2$ deposition | $2.0 \times 10^{-4}$ mbar O$_2$ |
| Evaporation rate ITO | 0.05 nm/s |
| O$_2$ Partial Pressure for ITO | $2.8 \times 10^{-4}$ mbar O$_2$ |
| Evaporation rate for Chrome | 0.4 nm/s |
| O$_2$ Partial Pressure for Chrome | $1.0 \times 10^{-4}$ mbar O$_2$ |
| Argon Gas Flow Through Ion Gun | 30 sccm |
| Ion Gun Neutraliser Filament Current | −0.120 A |
| Anode Current and Voltage | −0.90 A, +120 V |

Using these preferred deposition conditions results in an ITO deposit that can be included in an anti-reflection stack using the following configuration (based on Design #6) where the substrate is adjacent to the chrome oxide layer:

| Material | Layer Thickness |
|---|---|
| Substrate layer (hardcoat or lens) | |
| Cr$_2$O$_3$ | 1.0 nm |
| SiO$_2$ | 5.6 nm |
| ITO | 3.0 nm |
| SiO$_2$ | 47.6 nm |
| TiO$_2$ | 15.5 nm |
| SiO$_2$ | 27.2 nm |
| TiO$_2$ | 114.9 nm |
| SiO$_2$ | 81.3 nm |
| Atmosphere | |

Thicknesses of ITO between 0.1 nm and 150 nm will be acceptable provided the ITO layer contributes to the anti-reflection effect. Thicknesses of greater than 150 nm will typically be too optically absorbing to be of practical use in anti-reflection coatings since they are unlikely to meet the desired specifications. Furthermore, thicknesses of less than 0.1 nm are unlikely to provide the coating with sufficient electrical conductivity. In this respect, thicknesses in the range of 0.1 nm to 110 nm will generally be preferred for the sputtering embodiment, whereas thicknesses in the range of 0.1 nm to 5 nm will generally be preferred for the evaporation embodiment.

In the particular configuration described above, the 3 nm of ITO was found to be sufficient to impart a surface conductivity of $2 \times 10^8$ ohm/square to the coating (as measured at the outer silica layer). Again, it will be appreciated by a skilled addressee that it will therefore be possible to position the ITO conductive layer at many different positions within the stack and still obtain the required optical and electrical properties, in particular still meeting the requirement of the sheet resistance of the coating being less than $10^{10}$ ohm/square.

It should be noted that although these deposition conditions represent preferred conditions, the actual deposition conditions will ultimately depend upon the specific characteristics of the actual coating apparatus utilised. In the second preferred embodiment, the coating apparatus was a Balzers BAV1200 box coater with a Commonwealth ion gun and a Balzers electron beam source.

It should particularly be noted that it is envisaged that these deposition conditions may be varied by applying ranges in which acceptable, although perhaps not ideal, coatings may be produced. In this respect, it is envisaged that acceptable coatings will also be produced with partial pressures of oxygen during ITO deposition between $5 \times 10^{-6}$ mbar and $1 \times 10^{-3}$ mbar, and more preferably between $1.5 \times 10^{-4}$ mbar and $5 \times 10^{-4}$ mbar. Also, it is envisaged that the evaporation rate for ITO may be within the range of 0.01 nm/sec and 2 nm/sec, but more preferably between 0.01 nm/sec and 0.5 nm/sec.

In this respect, it will be appreciated by a skilled addressee that it will be necessary to link the ideal evaporation rates with the ideal oxygen levels in order to achieve the ideal coating—these conditions are interdependent and each condition will need optimising if the other parameter is changed. For example, if the rate is increased, the oxygen partial pressure will also require increasing. Indeed, the actual value requires determining for the particular evaporation apparatus used.

Figure 8B:
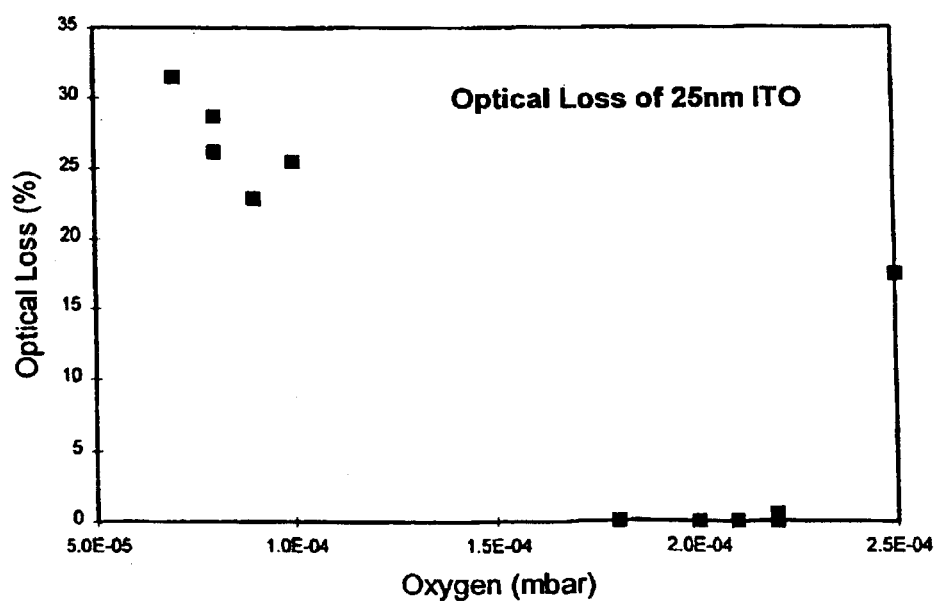

In this respect, reference is made to FIGS. 8(a) and 8(b) that illustrate how changes in the deposition parameters change both the optical and the electrical properties of samples manufactured in accordance with this second preferred embodiment. Also, FIG. 9 illustrates a typical theoretical reflection spectra for such a sample.

Third Preferred Embodiment

In accordance with a third preferred embodiment of the present invention, a further design was generated for coatings to be deposited by sputtering with an indium-tin oxide layer. The further design was as follows:

TABLE 4

|  | Design #7 |
| --- | --- |
| Layer on the (hardcoated) substrate | $SiO_2$ (50.0 nm) |
|  | ITO (5.0 nm) |
|  | $SiO_2$ (54.5 nm) |
|  | $ZrO_2$ (14.6 nm) |
|  | $SiO_2$ (25.0 nm) |
|  | $ZrO_2$ (123.8 nm) |
| Layer at the surface | $SiO_2$ (82.0 nm) |

Before experimentally depositing the coating of Design #7 on a hard coated CR39 piano lens for testing purposes, the optimum deposition conditions for the $SiO_2$, ITO and $ZrO_2$ layers were determined by conducting single layer deposition trials for each material and analysing the results.

The sheet resistance of the ITO layer was found to increase with the oxygen partial pressure and was lower when the auxiliary microwave plasma was used. Up to oxygen partial pressures of about $1 \times 10^{-3}$ mbar (without microwave) and about $1.5 \times 10^{-3}$ mbar (with microwave) the sheet resistance was found to be well below the threshold, $10^{10}$ ohm/square, that confers acceptable antistatic properties to the coated substrate. Thus, the deposition conditions selected in order to obtain ITO layers in Design #7 with low absorption and acceptable resistance, corresponded to film deposited at 800W (target power), with $0.5 \times 10^{-3}$ mbar partial pressure of oxygen, $5.6 \times 10^{-3}$ mbar for the argon partial pressure and use of the auxiliary microwave plasma. In this respect, reference is made to FIG. 10 and FIG. 11 that illustrate how changes in the deposition parameters change both optical and electrical properties of the samples manufactured in accordance with the third preferred embodiment.

The selected deposition conditions and main characteristics of the sputtered layers for the third embodiment are summarised in Table 5 below:

TABLE 5

|  | ITO | $SiO_2$ | $ZrO_2$ |
| --- | --- | --- | --- |
| Target material | $InO_2$ 90%-$SnO_2$10% | Si | Zr |
| Target Power density (W/cm$^2$) | 2.1 | 8 | 8 |
| Auxiliary Microwave Plasma | on | on | on |
| Argon Partial Pressure ($\times 10^{-3}$ mbar) | 5.7 | 6.6 | 7.0 |
| Oxygen Partial Pressure ($\times 10^{-3}$ mbar) | 0.5 | 1.1 | 0.8 |
| Front deposition rate (nm/s) | 0.11 | 0.58 | 0.58 |
| Back deposition rate (nm/s) | 0.10 | 0.45 | 0.54 |
| Luminous absorption (per 100 nm (%)) | 1 | 0 | 0–0.4 |
| Refractive index n @ 550 nm | 2.148 | 1.454 | 2.162 |
| Extinction coefficient k @ 550 nm | 0.086 | 0 | 0 |
| Surface resistivity (ohm/square) | $10^4$ | $>10^{13}$ | $>10^{13}$ |

Upon experimental deposition of the multi-layer coating of Design #7 on hard coated piano CR39 lenses, the coating of the third embodiment was able to tested for optical and physical performance.

In relation to optical performance, the luminous absorption was about $0.46 \pm 0.08\%$ and the overall reflection was about $1.15 \pm 0.02\%$ with a relative maximum around 520 nm. In this respect, FIG. 12 illustrates three typical experimental reflection spectra for samples prepared with the selected deposition conditions given above. Additionally, the absorption @440 nm was 1.5 to 2% for 2 side coated lenses.

In relation to sheet resistance, the repeatability of surface resistivity after deposition was excellent with values between $10^7$ and $3 \times 10^7$ ohm/sq. The surface resistivity was measured on samples exposed to UV light and water in a Standard Environmental Durability test. The resistivity value remained between $10^8$ and $10^9$ ohm/sq, still 100 times lower than the threshold value for acceptable antistatic properties.

In relation to durability testing, the coated lenses of the third embodiment were subjected to (and satisfied) a range of standard tests including the Salt Water Boil test, the Standard Environmental Durability test, an out door weathering test, a steel wool test, and a Bayer test.

In conclusion, the sputter deposition of a coating in accordance with the third embodiment produced an AR coating similar in structure to existing AR coatings deposited in similar manners having similar high and low index materials. Acceptable antistatic properties were obtained via a very thin ITO layer (5 nm) encapsulated between two silica layers at the hardcoat-AR coating interface of an ophthalmic lens. The sheet resistance conferred by the ITO layer to the AR coating was more than 100 times lower than the threshold value and remained unaffected over at least 2 months. Furthermore, the deposition process was found to be a very repeatable process, as the surface resistivity after deposition, and the optical characteristics, were very consistent over time.

Finally, it is to be understood that various other modifications and/or alterations may be made without departing from the spirit of the present invention as outlined herein.

What is claimed is:

1. An anti-static, anti-reflection, transparent coating for a transparent ophthalmic lens, the coating including at least one electrically conductive layer, wherein the sheet resistance of the coating is between about $10^7$ ohm/square to about $10^{10}$ ohm/square and the luminous transparency of the ophthalmic lens, when coated on both sides with the coating, is greater than about 95% and the luminous absorption due to the coating is less than about 1%.

2. A coating according to claim 1, wherein the ophthalmic lens is made from a material that is selected from the group consisting of glass, crystalline quartz, fused silica, soda-lime silicate glass, and plastic.

3. A coating according to claim 2, wherein the plastic is a polymer based on allyl diglycol carbonate monomers or a polycarbonate.

4. A coating according to claim 1, the coating including from 2 to 12 layers, at least one of which is the electrically conductive layer.

5. A coating according to claim 4, the coating including from 2 to 7 layers, at least one of which is the electrically conductive layer.

6. A coating according to claim 1, the coating having a thickness of from about 100 to 750 nm.

7. A coating according to claim 6, the coating having a thickness of from about 220 to 500 nm.

8. A coating according to claim 1, wherein the electrically conductive layer has a thickness of from 0.1 to 150 nm.

9. A coating according to claim 8, wherein the electrically conductive layer has a thickness of from 1 to 5 nm.

10. A coating according to claim 1, wherein the electrically conductive layer comprises a material that is selected from the group consisting of indium oxide, tin oxide, zinc oxide, and mixtures thereof.

11. A coating according to claim 1, wherein the electrically conductive layer contains a dopant to increase conductivity without altering optical transparency.

12. A coating according to claim 11, wherein the dopant is selected from the group consisting of fluorine, antimony, aluminum, boron, phosphor, iridium and mixtures thereof.

13. A coating according to claim 1, the coating being a three layer coating and having a lower layer of a mid-refractive index material, an intermediate layer of a high refractive index material, and an upper layer of a low refractive index material.

14. A coating according to claim 13, wherein the mid-refractive index material is silicon oxynitride.

15. A coating according to claim 13, wherein the intermediate layer is the electrically conductive layer.

16. A coating according to claim 13, wherein the low refractive index material is silicon dioxide.

17. A coating according to claim 1, the coating being a seven layer coating, having an adhesion layer of chrome oxide, subsequent alternating layers of low and high refractive index materials, and an outer layer of a low refractive index material, with the electrically conductive layer being between the adhesion layer and the outer layer.

18. A coating according to claim 17, wherein the electrically conductive layer is indium tin oxide.

19. A coating according to claim 17, wherein the low refractive index material is silicon dioxide.

20. A coating according to claim 17, wherein the high refractive index material is titanium dioxide or zirconium oxide.

21. An ophthalmic lens having an anti-static, anti-reflection transparent coating, the coating including at least one electrically conductive layer, wherein the sheet resistance of the coating is between about $10^7$ ohm/square to about $10^{10}$ ohm/square and the luminous transparency of the ophthalmic lens, when coated on both sides with the coating, is greater than about 95% and the luminous absorption due to the coating is less than about 1%.

22. An ophthalmic lens according to claim 21, wherein the coating includes from 2 to 12 layers, at least one of which is the electrically conductive layer.

23. An ophthalmic lens according to claim 21, wherein the coating includes from 3 to 7 layers, at least one of which is the electrically conductive layer.

24. An ophthalmic lens according to claim 23, wherein the electrically conductive layer has a thickness of from 0.1 to 150 nm.

25. An ophthalmic lens according to claim 21, wherein the coating has a thickness of from 220 to 500 nm.

26. An ophthalmic lens according to claim 21, wherein the electrically conductive layer comprises a material that is selected from the group consisting of indium oxide, tin oxide, zinc oxide, and mixtures thereof.

27. An ophthalmic lens according to claim 21, wherein the electrically conductive layer contains a dopant to increase conductivity without altering optical transparency.

28. An ophthalmic lens according to claim 27, wherein the dopant is selected from the group consisting of fluorine, antimony, aluminum, boron, phosphor, indium, and mixtures thereof.

29. An ophthalmic lens according to claim 21, wherein the coating is a three layer coating having a lower layer of a mid refractive index material, an intermediate layer of a high refractive index material, and an upper layer of a low refractive index material.

30. An ophthalmic lens according to claim 29, wherein the mid-refractive index material is silicon oxynitride.

31. An ophthalmic lens according to claim 29, wherein the intermediate layer is the electrically conductive layer.

32. An ophthalmic lens according to claim 29, wherein the low refractive index material is silicon dioxide.

33. An ophthalmic lens according to claim 21, the coating being a seven layer coating, having an adhesion layer of chrome oxide, subsequent alternating layers of low and high refractive index materials, and an outer layer of a low refractive index material, the electrically conductive layer being between the adhesion layer and the outer layer.

34. An ophthalmic lens according to claim 21, wherein the electrically conductive layer is indium tin oxide.

35. An ophthalmic lens according to claim 33, wherein the low refractive index material is silicon dioxide.

36. An ophthalmic lens according to claim 33, wherein the high refractive index material is titanium dioxide or zirconium oxide.

37. A method of fabricating a transparent ophthalmic lens, the method including the steps of:
  providing a transparent ophthalmic lens; and
  forming on a surface of the ophthalmic lens an anti-static, anti-reflection transparent coating having at least one electrically conductive layer, such that the sheet resistance of the coating is between about $10^7$ ohm/square to about $10^{10}$ ohm/square and the luminous transparency of the ophthalmic lens, when coated on both sides with the coating, is greater than about 95% and the luminous absorption due to the coating is less than about 1%.

38. A method according to claim 37, wherein the coating is deposited on the lens by reactive sputtering deposition.

39. A method according to claim 38, wherein the reactive sputtering deposition comprises sputtering of a metallic target in a gas phase composition.

40. A method according to claim 39, wherein the gas phase composition is an argon-oxygen mixture.

41. A method according to claim 39, wherein the metallic target is an indium-tin target.

42. A method according to claim 40, wherein the ratio of the partial pressure of argon to the partial pressure of oxygen in the argon-oxygen mixture during sputtering reaches up to about 0.15.

43. A method according to claim 39, wherein the target is maintained at a relatively constant voltage during deposition.

44. A method according to claim 38, wherein reactive sputtering deposition comprises sputtering of a target made of an electrically conductive material in a gas phase composition.

45. A method according to claim 44, wherein the gas phase composition includes oxygen.

46. A method according to claim 37, wherein the coating is deposited on the ophthalmic lens by the evaporation of a source material in a gas phase.

47. A method according to claim 46, wherein the gas phase is an argon-oxygen gas mixture.

48. A method according to claim 46, wherein the source material for the electrically conductive layer is selected from the group consisting of indium oxide, tin oxide and doped zinc oxide.

49. A method according to claim 48 wherein the dopant is selected from the group consisting of aluminum, boron, phosphor, indium, and mixtures thereof.

50. A method according to claim 46, wherein evaporation is assisted by providing the source material with extra energy.

51. A method according to claim 50, wherein the extra energy is from an ion or neutral atom beam source.

52. A method according to claim 46, wherein the electrically conductive layer is deposited under a partial pressure of oxygen of between $1.5 \times 10^{-4}$ mbar and $5 \times 10^{-4}$ mbar.

53. A method according to claim 52, wherein the partial pressure of oxygen is between $1.5 \times 10^{-4}$ mbar and $5 \times 10^{-4}$ mbar.

54. A method according to claim 46, wherein, during deposition of the electrically conductive layer the evaporation rate is between 0.01 nm/sec and 2 nm/sec.

55. A method according to claim 54, wherein the evaporation rate is between 0.01 nm/sec and 0.5 nm/sec.

* * * * *